US006704245B2

United States Patent
Becquey

(10) Patent No.: US 6,704,245 B2
(45) Date of Patent: Mar. 9, 2004

(54) SEISMIC PROSPECTING METHOD AND DEVICE USING SIMULTANEOUS EMISSION OF SEISMIC SIGNALS OBTAINED BY CODING A SIGNAL BY PSEUDO-RANDOM SEQUENCES

(75) Inventor: Marc Becquey, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 10/023,697

(22) Filed: Dec. 21, 2001

(65) Prior Publication Data

US 2002/0067659 A1 Jun. 6, 2002

(30) Foreign Application Priority Data

Dec. 21, 2000 (FR) .............................. 00 16831

(51) Int. Cl.$^7$ .............................. G01V 1/22; G01V 1/36
(52) U.S. Cl. .............................. 367/39; 367/40; 367/41; 702/17
(58) Field of Search ...................... 367/39–41; 175/50; 166/250.6; 702/17

(56) References Cited

U.S. PATENT DOCUMENTS

| | | | |
|---|---|---|---|
| 4,168,485 A | * 9/1979 | Payton et al. | ............... 367/41 |
| 4,675,851 A | 6/1987 | Savit et al. | |
| 4,780,856 A | 10/1988 | Becquey | |
| 5,226,018 A | * 7/1993 | Chang et al. | ............... 367/39 |
| 5,406,530 A | 4/1995 | Yamamoto | |
| 5,721,710 A | 2/1998 | Sallas et al. | |

FOREIGN PATENT DOCUMENTS

EP 0266054 A1 4/1988

* cited by examiner

Primary Examiner—Nelson Moskowitz
(74) Attorney, Agent, or Firm—Antonelli, Terry, Stout & Kraus, LLP

(57) ABSTRACT

Seismic prospecting method and device using simultaneous emission of seismic signals obtained by coding a signal by pseudo-random sequences, and notably a periodic signal phase modulated by such sequences.

Signals such as, for example, periodic signals phase modulated according to a pseudo-random code (binary for example), produced by a control unit, are for example emitted in the ground by means of vibrators, the seismic signals reflected by the subsoil discontinuities in response to the periodic signals emitted are picked up by receivers coupled with the formation and recorded in an acquisition and recording system. The periodic signals are emitted simultaneously by the vibrators. The control sequences of the coded periodic signals intended for all the vibrators are obtained either from the same random binary sequence with respective time lags evenly distributed over the length of the control sequence according to the number of vibrators used simultaneously (first mode), or from different sequences selected from among a group of sequences of minimum crosscorrelation (second mode), or by combining the two aforementioned modes. The respective contributions of the various vibrators are separated by correlating the signals received and recorded with signals constructed from the various control sequences obtained with time lags. The vibrators can be divided into several groups, the vibrators of each group being controlled by a binary sequence belonging to a minimum crosscorrelating group.

Application: seismic prospecting or seismic monitoring of reservoirs for example.

36 Claims, 4 Drawing Sheets

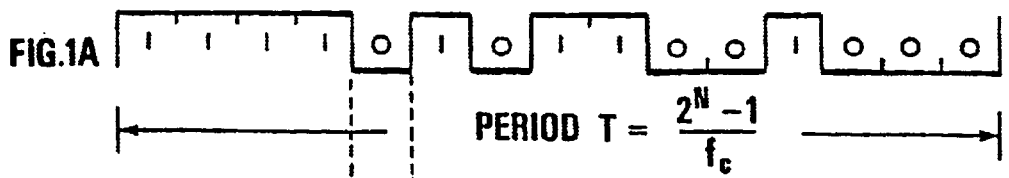
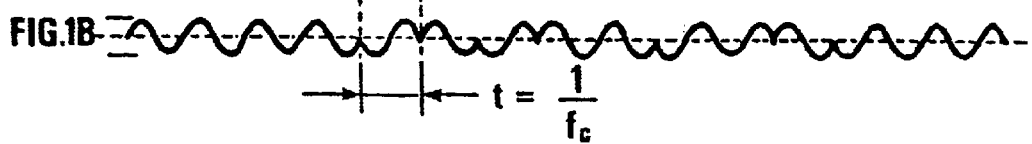
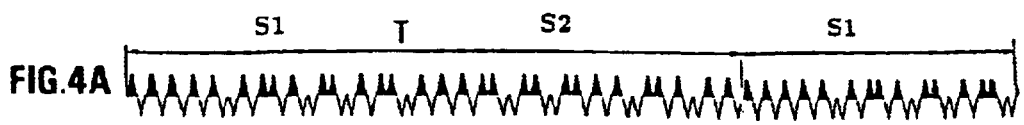
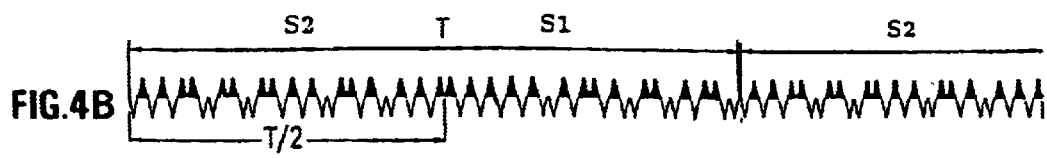
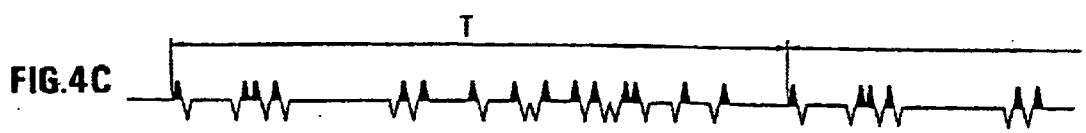
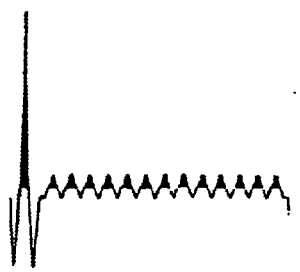
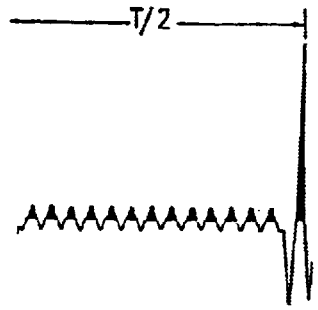

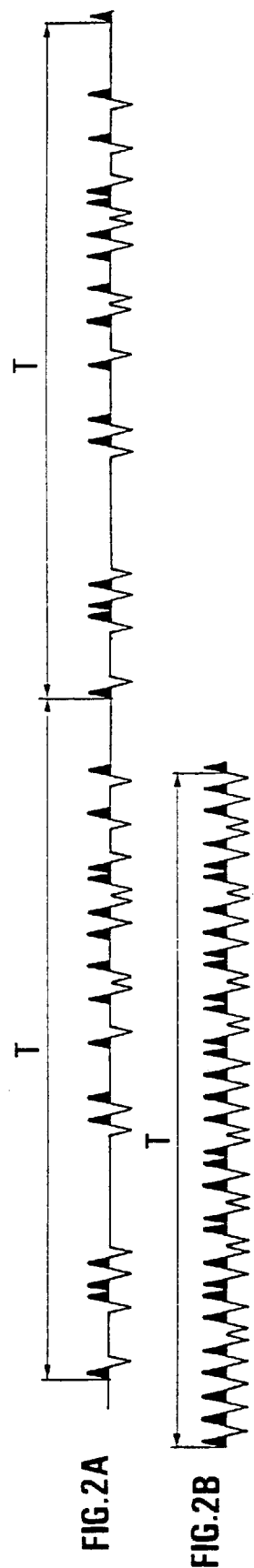
FIG.2A
FIG.2B
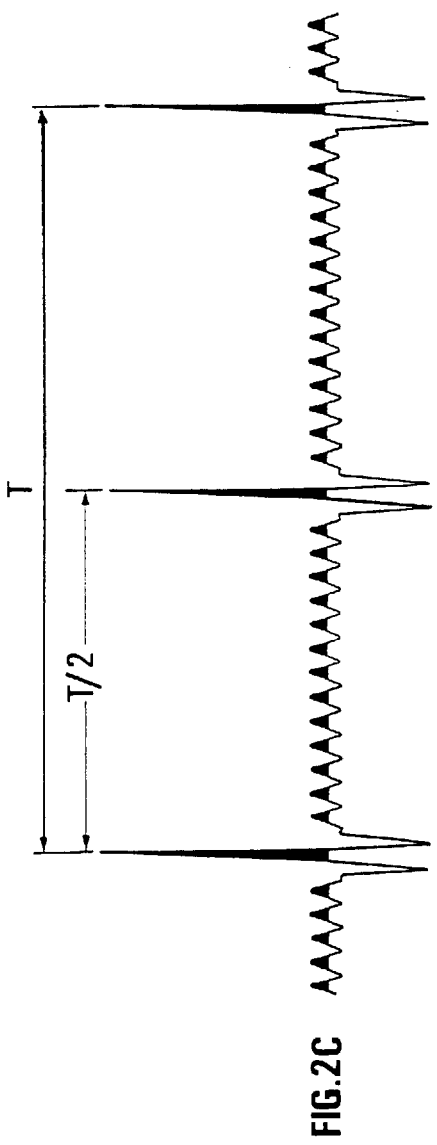
FIG.2C

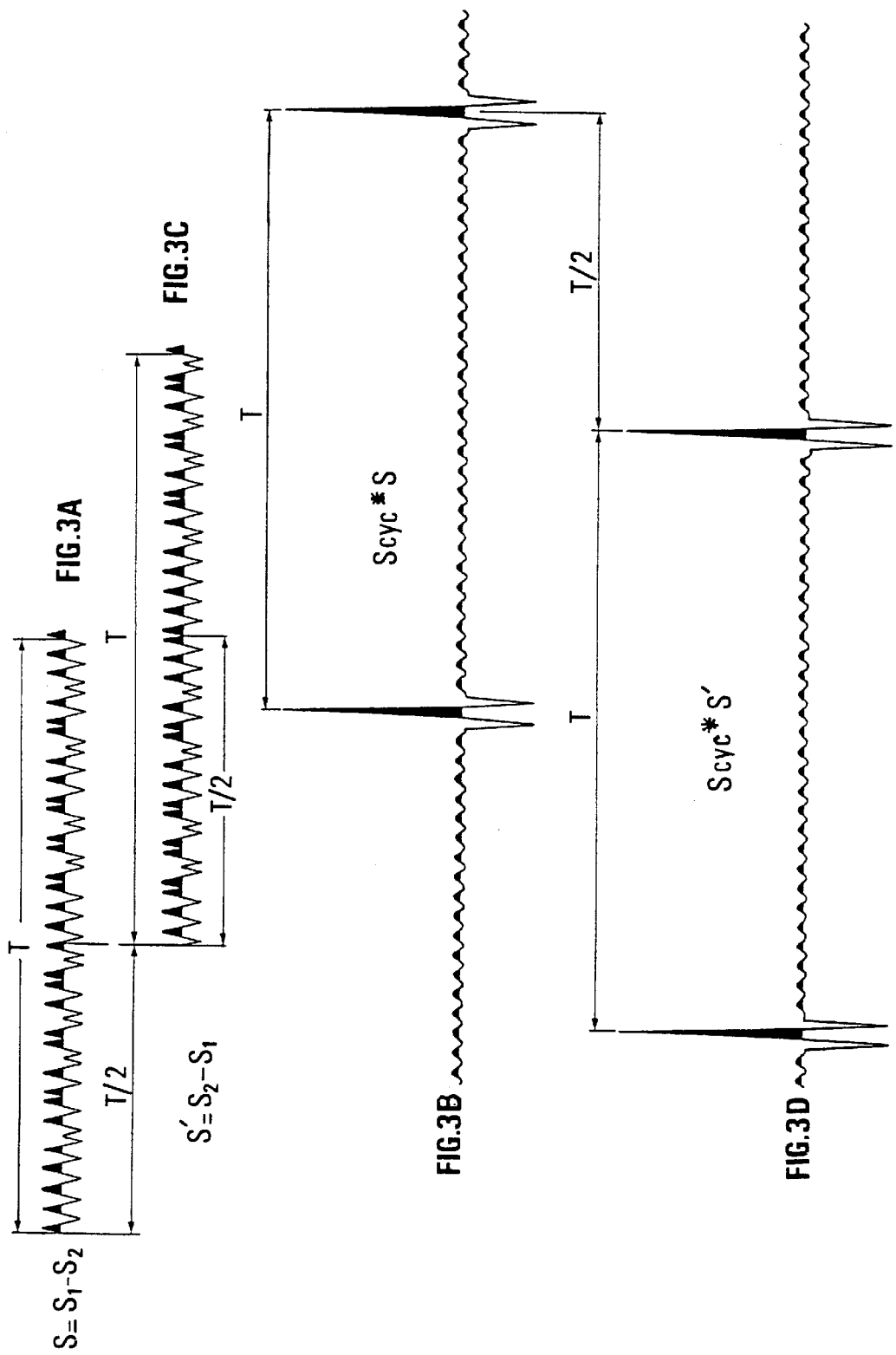

FIG.5
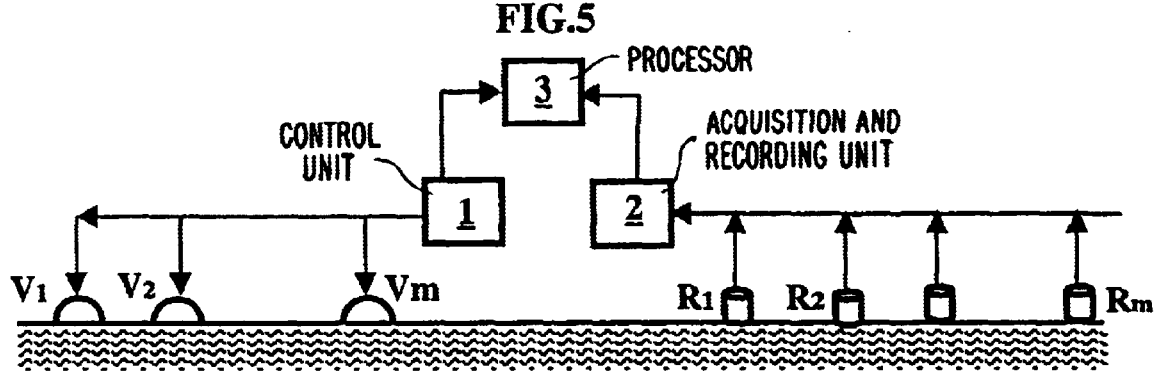
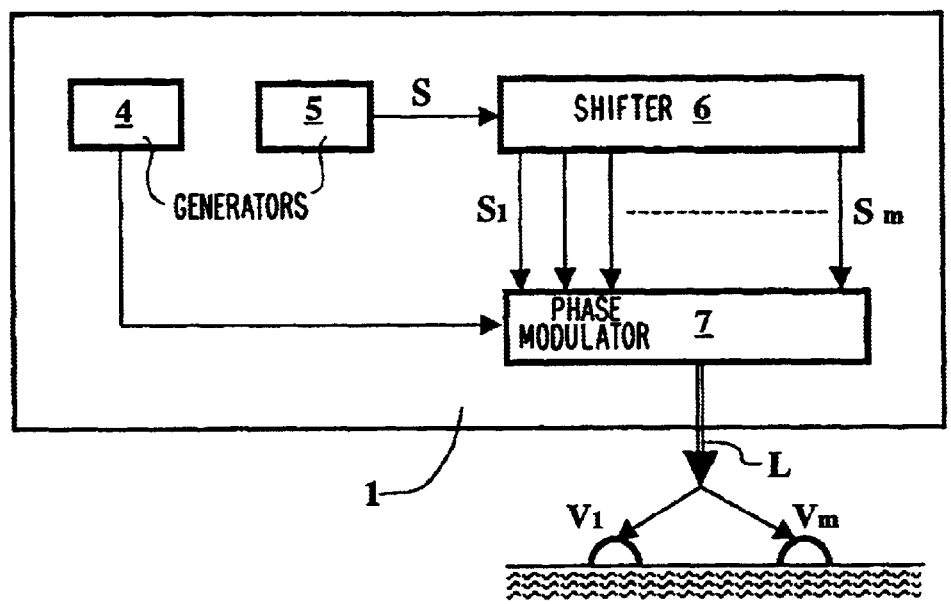
FIG.6
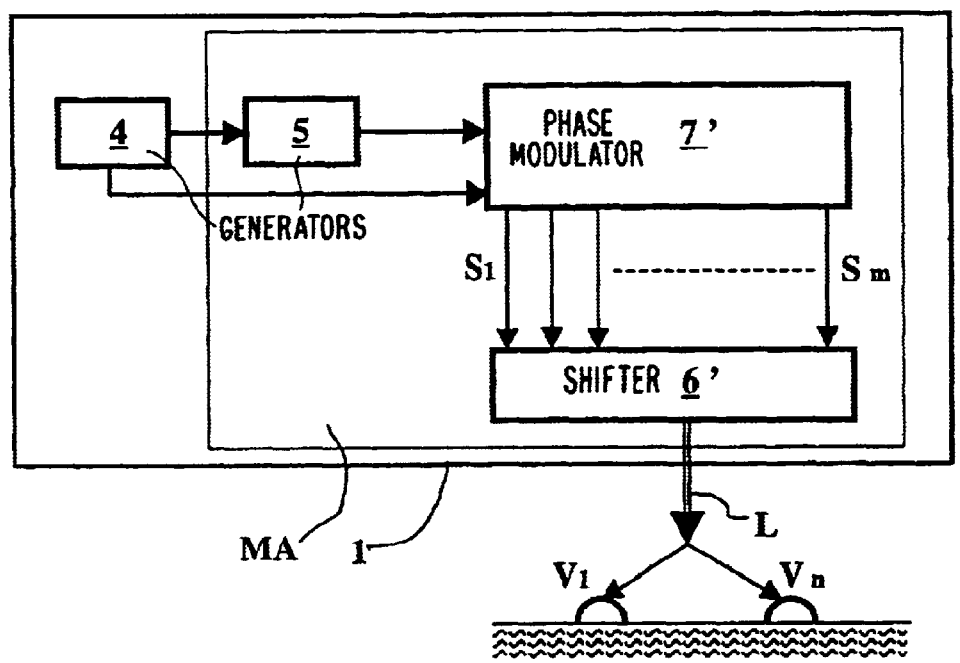
FIG.7

SEISMIC PROSPECTING METHOD AND DEVICE USING SIMULTANEOUS EMISSION OF SEISMIC SIGNALS OBTAINED BY CODING A SIGNAL BY PSEUDO-RANDOM SEQUENCES

BACKGROUND OF THE INVENTION

1. Field of the Invention

The present invention relates to a method and to a device used for land seismic prospecting by simultaneous emission in the ground of seismic signals emitted by several vibrators or groups of vibrators, these signals being obtained by coding a signal by pseudo-random sequences, and notably of a periodic signal phase modulated by such sequences.

2. Description of the Prior Art

There are well-known land seismic prospecting methods comprising transmission in the ground, for several seconds, of a periodic signal whose frequency varies continuously within a frequency band, reception by pickups of the signals reflected by underground reflectors and recording of the received signals. As a result of the emission time, the signals picked up are combinations of signals reflected by reflectors arranged at very different depths. The image of the various reflectors in the subsoil can only be recovered by processing the signals picked up, including correlation thereof with the signals emitted. The processing result is identical to that obtained by convolving the autocorrelation function of the signal emitted by the reflection coefficients of the various reflectors. The seismic trace obtained is the image of the interfaces between the various geologic layers midway between the emission and reception points. Such a method is for example described in U.S. Pat. No. 2,688,124.

This method however has some drawbacks. The autocorrelation function that is obtained in this case exhibits secondary peaks on either side of the main peak, whose amplitude is quite significant. Furthermore, a time interval at least equal to the loop travel time of the waves emitted down to the deepest reflector in the zone explored, referred to as "listening interval", has to be provided between two successive emission sequences so that the strong signals picked up at the beginning of the corresponding recording sequence cannot conceal the weaker signals coming from more distant reflectors, picked up at the end of the previous recording sequence. The necessary emission interruptions during a relatively long listening time interval have the effect of limiting the energy transmitted.

There is also another well-known method wherein various vibrators emit simultaneously signals with an identical frequency sweep, the lag between the emissions being at least equal to the listening time.

Pseudo-Random Binary Sequences

Other known land seismic prospecting methods use a technique that is well-known in the field of communications and radars. They comprise using periodic sources that transmit signals obtained by modulating the phase of a periodic carrier signal by a binary signal or pseudo-random code consisting of a sequence of elements that can take on two logical values 0 or 1. As shown in FIG. 1, the order of succession of these values is selected so as to have a random character.

When, for such a code, any sequence of n successive bits (n integer) can be repeated identically only after a sequence of $(2^{n-1})$ bits, the sequence is referred to as "Binary Sequence of Maximum Length" (SBLM). These pseudo-random binary sequences can be used for phase modulation of a periodic signal, each element of the sequence being associated with a period of the signal, by keeping or by inverting the sign according to whether it is a 1 or a 0. The term "elementary sequence" designates a portion of the periodic signal modulated by a binary sequence of $(2^{n-1})$ terms, of length $(2^{n-1})$. Tc, where Tc is the period of the carrier signal.

Correlation, by an elementary sequence, of a signal consisting of the repetition of this elementary sequence modulated by the elementary sequence (FIG. 2b) gives (FIG. 2c) peaks spaced out (in time) by the length of sequence $T_s$, and a minimum (or even zero) level between the peaks or, more exactly, over the length of the sequence minus the period of the carrier Tc. The ratio of the correlation peak to the correlation noise is equal to the number of terms of the sequence.

Such methods are for example described in U.S. Pat. NO. 3,234,504, 3,264,606, 4,034,333 and 4,069,470.

U.S. Pat. No. 4,780,856 filed by the assignee describes a marine seismic prospecting method wherein the emission means comprises at least one vibrator towed by a boat progressing continuously along a seismic profile to be studied, emitting an uninterrupted series of sequences consisting each of a periodic carrier signal phase modulated by a pseudo-random binary coding signal of maximum length. The signals reflected by the discontinuities of the medium are correlated with the coded signals emitted so as to obtain correlation peaks at time intervals shorter than or at most equal to the period of repetition of the successive emission sequences. The periodic source can be the sole source, correlation being carried out between the signals received and alternately two sequences of signals emitted deducible from one another by a time lag shorter than the period of repetition of the sequences. A lag equal to the half-period of repetition of the sequences of signals emitted can for example be selected.

It is also possible to use at least two periodic sources emitting simultaneously sequences of identical signals but with a time lag between them, and a correlation is established between the signals received, which correspond to the signals emitted simultaneously by the sources, and at least one sequence of coded signals, so as to alternately obtain correlation peaks corresponding to each periodic source.

The use, in land seismic prospecting, of vibrators emitting simultaneously or insufficiently separated in time has drawbacks linked with various factors: the autocorrelation noise, the harmonics and the slow waves.

Autocorrelation Noise

The vibroseismic signal is compressed by correlating the signals recorded by the signal controlling the vibrator (or by a combination of the signals of the plate and mass accelerometers of the vibrator). The equivalent of the correlation of the series of reflection coefficients is thus obtained by autocorrelation of the signal emitted. The signal emitted is generally a frequency linear sweep whose amplitude spectrum has either a crenellated shape, or it is preferably a bell curve to reduce the amplitude of the bounces.

The question of autocorrelation noises arises for all the vibroseismic records. The bounces decrease with time as a function of substantially. For an isolated record, the autocorrelation bounces of the great values at the beginning of a trace are sufficiently attenuated when the weakest reflections at the end of a trace reappear. In the case of a frequency slip sweep, recording is semi-continuous and the bounces of the great values are found in front and behind, and they can interfere with the low values of the deep reflections of the previous shot if the slip time is insufficient.

Harmonics

For an isolated vibroseismic record, the harmonic distortion adds oscillations to the correlated signal. If the sweep is carried out from the low frequencies to the high frequencies, the oscillations due to the correlation of the harmonics by the control signal are precursors. Thus, except for the closest traces comprising the surface noise, the noises due to the correlation of the harmonics mix with an earlier, therefore in principle stronger signal. For continuous slip sweep type records, the noise due to the harmonics of the early arrivals of a shot can be superposed on the late and therefore weaker arrivals of the previous shot.

Slow Waves

If the time interval between the start of two successive shots decreases, there is a risk the slowest waves of a shot, air waves and surface waves, may be found on the next shot. The sweeps being identical from one shot to the next, the air wave and the surface noises will be compressed similarly on the two shots.

Minimum Correlation Sequences

It is well-known that there are, for each size of binary sequence of maximum length, minimum correlation pairs for which the ratio of the central peak to the greatest secondary peak is:

$$\frac{2^n - 1}{1 + 2^{wholepart\left(\frac{n+2}{2}\right)}}$$

i.e. about 30 dB for n=11, corresponding to $2^{11}-1 =2047$ periods of the carrier signal (34 seconds for a 60 Hz carrier). There are connected sequences whose correlations are minimum two by two. The number of sequences of each set depends on the size of the sequences. For a sequence with 2047 elements, this number is 4.

SUMMARY OF THE INVENTION

The method according to the invention allows prospecting or monitoring operations in an underground formation by elastic waves. It comprises emitting in the ground elementary sequences formed by coding a signal by pseudo-random sequences, receiving and recording the signals reflected by the subsoil discontinuities in response to the signals emitted, and processing the signals recorded by correlation with signals constructed from the signals emitted. The signals are emitted simultaneously by several seismic sources controlled each by a signal of an elementary sequence whose length is at least equal to the product of the number of seismic sources vibrating simultaneously by the listening time, the respective contribution of each one of the various seismic sources being separated by correlating the signals received and recorded by signals constructed from the elementary sequence, extended, on the right and on the left, with parts whose length is at least equal to the listening time, of this elementary sequence, obtained by circular permutation.

According to a preferred implementation mode, the elementary sequences are formed by phase modulation of a periodic signal and these sequences are applied to vibrators.

The same control sequence is for example applied to all the vibrators, with a time lag and a circular permutation, the time lags between two sequences being at least equal to the listening time, and the length of the elementary control sequence is at least equal to the sum of the time lags and of the listening time.

According to another implementation mode, the vibrators are controlled by a connected set of several minimum crosscorrelation sequences, each vibrator emitting a vibration with its own sequence independently of the other vibrators.

According to another implementation mode, the previous two modes are combined by dividing the vibrators into several groups, and each group is assigned a pseudo-random sequence belonging to the same group of minimum crosscorrelation sequences, the various vibrators of the same group being controlled by the same elementary sequence with the time lags.

The device which is used for prospecting or monitoring in a formation by elastic waves according to the invention comprises at least one group of m vibrators, a control unit which applies to the various vibrators elementary sequences formed by phase modulation of a periodic signal by pseudo-random sequences, seismic receivers coupled with the formation, a system which acquires and records the seismic signals reflected by the subsoil discontinuities in response to the periodic signals emitted and a system which processes the recorded seismic signals, by correlation with part of the periodic signals emitted. The control unit comprises a periodic signal generator and a modulation set for forming m elementary sequences phase modulated by a pseudo-random sequence and connection which applies simultaneously to the various vibrators of each group the signals produced by the modulation set.

According to a first embodiment, the modulation set comprises a generator which generates at least one pseudo-random control sequence, a time lag which forms at least one set of m elementary sequences with time lags between each sequence respectively, a phase modulator of the periodic signals generated by the generator respectively by the m elementary sequences, generating m phase modulated periodic signals.

According to another embodiment, the modulation set comprises a generator which generates at least one pseudo-random control sequence, a modulator which modulates, by the sequence, the periodic signals generated by the generator, and a time lag which produces m modulated periodic signals with a time lag between each signal.

The device comprises for example p groups of vibrators, and the control unit is suited to generate p minimum crosscorrelation elementary sequences and applies these sequences with a time lag to the vibrators of each group.

According to an implementation of the device, the vibrators are installed permanently for seismic monitoring of an underground zone.

The method according to the invention, with this use of periodic signals obtained by phase modulation of a carrier signal by pseudo-random binary sequences, and simultaneous recording of several seismic sources, minimizes the correlation noise and prevents harmonic correlation noise. It lends itself better to simultaneous recording than the frequency sweeps conventionally used in land seismic prospecting.

BRIEF DESCRIPTION OF THE DRAWINGS

Other features and advantages of the method and of the device according to the invention will be clear from reading the description hereafter, with reference to the accompanying drawings wherein:

FIGS. 1A and 1B show examples of signals obtained by phase displacement,

FIGS. 2A to 2C show examples of signals obtained by correlation of a SBLM sequence, FIGS. 3A to 3D show examples of signals obtained by correlation by a sequence modified by a time lag, FIGS. 4A to 4E show various recorded signals corresponding to two phase modulated periodic sources that emit simultaneously, FIG. 5 diagrammatically shows the device, FIG. 6 shows the control unit intended for the various vibrators, and FIG. 7 shows a variant of the control unit.

DETAILED DESCRIPTION OF THE PREFERRED EMBODIMENTS OF THE INVENTION

Correlation by a Sequence Modified by a Time Lag

Let a sinusoidal signal of frequency $fi$ (and of period $$T_c = \frac{1}{f_c}$$

modulated by a SBLM sequence S of length $Ts=(2^n-1)$ Tc, with n an integer. Sequence S is split up into two subsequences $S_1$, consisting of the $2^{n-1}$ first carrier periods of S, and $S_2$, consisting of the rest of the sequence, i.e. $2^{n-1}-1$ carrier periods, $S=(S_1\ S_2)$ (FIG. 3A). Let $S_{cyc}$ be the signal period from sequence S, i.e. consisting of cycles (S S S . . .). Correlation of $S_{cyc}$ by elementary sequence S gives (FIG. 3B) peaks spaced out by the length of sequence $T_s$. If another SBLM sequence is generated by applying a time lag of $2^{n-1}$ terms and a complement by circular permutation, i.e. sequence $S'=(S_2\ S_1)$ (FIG. 3C), correlation of $S_{cyc}$ by S' also gives peaks spaced out by a time $T_s$ (FIG. 3D). These peaks exhibit a time lag $2^{n-1}T_c$ corresponding to the length of $S_1$ in relation to the peaks of the $S_{cyc} * S$ correlation.

Land Seismic Prospecting - Vibration Time and Listening Time

In land seismic prospecting, the source vibrates at a fixed point and its vibration is interrupted long enough to allow displacement thereof to a next position and coupling with the ground. The relations between the length of the elementary sequence cycle, the vibration time and the listening time therefore have to be determined. What is referred to as "listening time" hereafter is the maximum travel time between a source and a wave receiver of an elastic wave that will reflect on the deepest reflector in the zone explored.

An underground reflector is considered at the time $t$ (time required for the sound wave to move from the source to the receiver(s) by reflecting on the reflector). If the source emits a cyclic vibration $S_{cyc}$ of elementary sequence S, this vibration will be recorded from the time t. Correlation by the elementary sequence S will give a peak at the time t, i.e. a signal between $t-T_c$ and $t+T_c$, where $T_c$, is the period of the carrier, other peaks spaced out by multiples of the length of elementary sequence $T_s$, and a minimum noise between the peaks, therefore between $t-T_s+T_c$, and $t+T_s-T_c$.

For a reflector at the time 0, a narrow signal from 0 to $T_c$ and a minimum noise plateau up to $T_s-T>T_e$ occur. For a reflector at the time $T_c<t<T_e<-T_s-T_c$, a narrow signal between $t-T_c$ and $t+T_c$, and a minimum correlation noise plateau from 0 to $t-T_c$, and from $t+T_c$, to $T_e$ occur. Correlation of $S_{cyc}$ by its elementary sequence S allows to find again the series of reflection coefficients convolved by a three-arch signal of total width $2T_c$.

For a correlation over a time equal to listening time $T_e$, the signal emitted can be limited to a portion of cyclic signal $S_{cyc}$ of length $Ts+2T_e$ equal to the sum of the length of the sequence and of twice the listening time, the elementary sequence occupying the center of this cyclic signal portion.

Similarly, it is possible to emit a signal of a single elementary sequence and to correlate the record of the signals reflected by a cyclic repetition portion of this elementary sequence of length $T_s+2T_e$, this elementary sequence occupying the center of this cyclic signal portion.

The case where two sources are simultaneously recorded is considered, one vibrating with signal $S_{cyc}$ of length at least equal to twice the listening time, split up into two subsequences S1 and S2, each subsequence being equal to or greater than the listening time, the other vibrating with the sequence modified by a time lag and completed by circular permutation of the two sequences S2 and S1. The mechanism of separation of these two records is illustrated by FIGS. 4A to 4E.

The first vibration V1 (FIG. 4A) consists of the two subsequences S1, S2.

Signal V2 is obtained (FIG. 4B) by time lag and circular permutation of V1. V2 has in order, two subsequences S2 and S1. The third signal (FIG. 4C) is the sum of V1 and V2. Correlation of signal V1 by the cyclic signal portion formed from elementary sequence (S2 S1 S2 S1) (FIG. 4D) between the times 0 and $T_e$ leads to a peak at the time t and to a very weak correlation noise from 0 to $t-T_c$ and from $t+T_c$ to $T_e$.

Correlation of V2 by the permuted sequence modified by a time lag (S1 S2 S1 S2) (FIG. 4E) leads to a peak at $t+T_e$ (when sequence (S1 S2) is opposite an identical sequence) and nothing around. From 0 to the listening time, we only have the (minimum) correlation noise.

Therefrom it is deduced that the correlation from 0 to the listening time of the sum signal (FIG. 4C) by sequence (S2 S1 S2 S1) will again gives the peak corresponding to signal V1 superposed on the (minimum) correlation noise with V2, whereas correlation by the permuted sequence modified by a time lag (S1 S2 S1 S2) will give the peak corresponding to signal V2. The signals of the vibrators vibrating simultaneously are separated by successive correlations with sequences modified by a time lag (the listening time at least) completed by circular permutation.

Generalization to m Sources

The previous result can be generalized for m vibrators. Consider m vibrators vibrating simultaneously for a time $T_v=(m-I)T_e$. The signal emitted by the first vibrator is an elementary sequence whose length is at least equal to the product of the number m of vibrators vibrating simultaneously by the listening time, i.e. $T_s>mT_e$. This sequence can be split up into m parts of length $S_1, S_2, \ldots, S_n$ greater than or equal to the listening time. Correlation of the record of a reflected signal, starting to arrive at the time t, by correlation signal $(S_n, S1, S_2, \ldots, S_n, S_1)$ gives a peak at the time it and a very weak correlation noise everywhere else between 0 and $T_e$. Correlation of the record between 0 and $T_e$ by any one of the sequences deduced from the first sequence by circular permutation with a time lag of a multiple of $T_e$: $(S_2, S_3, \ldots, S_n, Si), (S_3, \ldots, S_n, S_1, S_2), \ldots, (S_n, S_1 S_2 \ldots, S_n-1)$ will only give a minimum correlation noise.

If a second vibrator vibrates at the same time as the first one with a sequence modified by a time lag and completed by circular permutation $S'=S_2 S_3 \ldots S_n$, correlation by S will give only a minimum correlation noise. Only correlation by S' will lead to a peak at the time t.

The simultaneous record of several vibrators can thus be split up into components connected to each vibrator by successive correlations with sequences modified by a time lag equivalent to the listening time and completed on the right and on the left by the closest subsequences from the point of view of the circular permutation or, if these subsequences are greater than the listening time, by portions of a length equal to the listening time.

EXAMPLE

Consider five vibrators vibrating simultaneously with SBLM sequences of $2^{10}-1=1023$ terms modulating a 60 Hz carrier and deduced from one another by time lag and circular permutation. The length of the sequence is thus $$\frac{1023}{60} \sim 17$$

seconds. The listening time will correspond (to within some carrier periods) to one fifth of the length of the sequence, i.e.

$$\frac{17}{5} \sim 3.4$$

seconds. The length of the (simultaneous) vibration of the vibrators will be 17 seconds. The correlation signal will have the length as follows: 17+2×3.4=23.8s.

Minimum Correlation Sequences

If a correlation noise of —30 dB is accepted, it is possible to use for example an emission device comprising 4 lines of 5 vibrators each, vibrating simultaneously and controlled by a 34-s sequence, for a listening time of 6.8 s. On a first line, the vibrators vibrate simultaneously or not, with the same sequence modified by a suitable time lag as described. The next vibrator lines are controlled by sequences belonging to the set of minimum correlation sequences to which the first sequence belongs. The vibrators of each line start as soon as they are in the field and ready to vibrate. It is not necessary to synchronize the start of the various lines. An appreciable productivity gain can thus be obtained.

The implementation device (FIG. 5) comprises a control unit 1 which applies to m vibrators coupled with the formation phase modulated periodic signals, a system 2 which acquires and records the signals picked up by seismic receivers R1Rk coupled with the formation in response to the periodic emitted signals, and a processing system 3 which processes the seismic signals picked up by receivers R1 to Rk, such as a programmed computer, by correlation with the signals emitted.

Control unit 1 comprises a periodic signal generator and a modulation set MA which generates, from the periodic signals, m phase modulated periodic signals for application to the m vibrators V1-Vm.

According to a first embodiment (FIG. 6), modulation set MA comprises a generator 5 for generating at least one pseudo-random control sequence, elements 6 for producing a time lag so as to form, from the sequence, at least one set of m pseudo- random binary sequences with a time lag between each one respectively. The time lags are distributed over the length of the control sequence according to the number m of vibrators of each group.

A phase modulation device 7 is connected to signal generator 4 and to elements 6 which applies a time lag to the periodic signals, and generates m phase modulated periodic signals. Device 7 is connected by connection (L) to the various vibrators (V1-Vm) of each group.

According to a second embodiment (FIG. 7), modulation set MA comprises a generator 5 which generates at least one pseudo-random control sequence, a modulation device 7' for modulating the periodic signals generated by generator (4) by the sequence, a modulator 6' which produces m modulated periodic signals comprising a time lag between each one.

Device 7' is similarly connected to the various vibrators (V1-Vm) of each group by connection means L.

Any type of pseudo-random sequence can be selected for phase modulation of the signals.

What is claimed is:

1. A method of prospecting or monitoring of an underground formation by elastic waves, comprising:
   emitting in the ground elementary sequences formed by coding of a signal by pseudo-random sequences, receiving and recording the signals reflected by subsoil discontinuities in response to the emitted signals, and processing the recorded signals by correlation with signals formed from the emitted signals; and wherein
   the signals are emitted simultaneously by seismic sources each controlled by a signal of an elementary sequence of a length at least equal to a product of a number of seismic sources vibrating simultaneously by a listening time, a respective contribution of each one of the seismic sources being separated by correlating the received and recorded signals by signals constructed from the elementary sequence, extended with parts of a length at least equal to the listening time of the elementary sequence, obtained by circular permutation.

2. A method as claimed in claim 1, wherein:
   the elementary sequences are formed by phase modulation of a periodic signal applied to vibrators.

3. A method as claimed in claim 2, wherein:
   a same control sequence is applied to all the vibrators, with a time lag and a circular permutation, the time lag between two vibrators being at least equal to the listening time, and a length of the elementary control sequence being at least equal to a sum of the time lag and of the listening time.

4. A method as claimed in claim 2, wherein:
   the vibrators are controlled by a connected set minimum crosscorrelation sequences, each vibrator emitting a vibration with a sequence independently of the other vibrators.

5. A method as claimed in claim 3, wherein:
   the vibrators are divided into groups, and a pseudo-random sequence belonging to the same group of minimum crosscorrelation sequences is assigned to each group, the vibrators of a group being controlled by a same elementary sequence with the time lag.

6. A device intended for prospecting or monitoring of an underground formation by elastic waves, comprising:
   at least a group of m vibrators, a control unit including a signal generator which controls the vibrators by phase modulated periodic signals, a connection which applies to the vibrators of each group the signals produced by the control unit, seismic receivers coupled with the formation, a system which acquires and records the seismic signals reflected by subsoil discontinuities in response to the emitted periodic signals and a system which processes the recorded seismic signals, by correlation with part of the emitted periodic signals, wherein the control unit includes a modulator which forms m elementary sequences phase modulated by a pseudo-random sequence, the signals generated by the control unit being simultaneously applied to the different vibrators by the connection; and wherein the vibrators are permanently installed for seismic monitoring of an underground zone.

7. A device as claimed in claim 6, wherein:
the modulator comprises a generator which generates at least one pseudo-random control sequence, a time lag which forms at least one set of m elementary sequences with a time lag between each one respectively, a phase modulator which phase modulates the periodic signals generated by the generator respectively by the m elementary sequences to generate m phase modulated periodic signals.

8. A device as claimed in claim 6, wherein:
the modulator comprises a generator which generates at least one pseudo-random control sequence, a modulator which modulates, by the sequence, the periodic signals generated by the generator, and a time lag which produces m modulated periodic signals with the time lag between each one.

9. A device as claimed in claim 6, wherein:
the signals emitted by the control unit depend on a length of each control sequence and of a received vibrational signal listening time.

10. A device as claimed in claim 6, comprising:
p groups of vibrators, the control unit generating p minimum crosscorrelation elementary sequences and applying the sequences to the vibrators of each group with a time lag.

11. A device as claimed in claim 6, wherein:
the vibrators are permanently installed for seimic monitoring of an underground zone.

12. A device as claimed in claim 7, wherein:
the signals emitted by the control unit depend on a length of each control sequence and of a received vibrational signal listening time.

13. A device as claimed in claim 8, wherein:
the signals emitted by the control unit depend on a length of each control sequence and of a received vibrational signal listening time.

14. A device as claimed in claim 7, comprising:
p groups of vibrators, the control unit generating p minimum crosscorrelation elementary sequences and applying the sequences to the vibrators of each group with a time lag.

15. A device as claimed in claim 8 comprising:
p groups of vibrators, the control unit generating p minimum crosscorrelation elementary sequences and applying the sequences to the vibrators of each group with a time lag.

16. A device as claimed in claim 9, comprising:
p groups of vibrators, the control unit generating p minimum crosscorrelation elementary sequences and applying the sequences to the vibrators of each group with a time lag.

17. A device as claimed in claim 6, comprising:
p groups of vibrators, the control unit generating p minimum crosscorrelation elementary sequences and applying the sequences to the vibrators of each group with a time lag.

18. A device as claimed in claim 7, comprising:
p groups of vibrators, the control unit generating p minimum crosscorrelation elementary sequences and applying the sequences to the vibrators of each group with a time lag.

19. A device as claimed in claim 7, wherein the vibrators are permanently installed for seimic monitoring of an underground zone.

20. A device as claimed in claim 8, wherein the vibrators are permanently installed for seimic monitoring of an underground zone.

21. A device as claimed in claim 9, wherein the vibrators are permanently installed for seimic monitoring of an underground zone.

22. A device as claimed in claim 10, wherein the vibrators are permanently installed for seimic monitoring of an underground zone.

23. A device as claimed in claim 12, wherein the vibrators are permanently installed for seimic monitoring of an underground zone.

24. A device as claimed in claim 13, wherein the vibrators are permanently installed for seimic monitoring an underground zone.

25. A device as claimed in claim 14, wherein the vibrators are permanently installed for seimic monitoring of an underground zone.

26. A device as claimed in claim 15, wherein the vibrators are permanently installed for seimic monitoring of an underground zone.

27. A device as claimed in claim 16, wherein the vibrators are permanently installed for seimic monitoring of an underground zone.

28. A device as claimed in claim 17, wherein the vibrators are permanently installed for seimic monitoring of an underground zone.

29. A device as claimed in claim 18, wherein the vibrators are permanently installed for seimic monitoring of an underground zone.

30. A device intended for prospecting or monitoring of an underground formation by elastic waves, comprising:
at least a group of m vibrators, a control unit including a signal generator which controls the vibrators by phase modulated periodic signals, a connection which applies to the vibrators of each group the signals produced by the control unit, seismic receivers coupled with the formation, a system which acquires and records the seismic signals received by the seismic receivers which are reflected by subsoil discontinuities in response to the emitted periodic signals and a system which processes the recorded seismic signals, by correlation with part of the emitted periodic signals, the control unit includes a modulator which forms m elementary sequences phase modulated by a pseudo-random sequence, the signals generated by the control unit being simultaneously applied to the different vibrators by the connection; and wherein
the modulator comprises a generator which generates at least one pseudo-random control sequence, a time lag which forms at least one set of m elementary sequences with a time lag between each one respectively, a phase modulator which phase modulates the periodic signals generated by the generator respectively by the m elementary sequences to generate m phase modulated periodic signals; and the signals emitted by the control unit depend on a length of each control sequence and of a received vibrational signal listening time.

31. A device intended for prospecting or monitoring of an underground formation by elastic waves, comprising:

at least a group of m vibrators, a control unit including a signal generator which controls the vibrators by phase modulated periodic signals, a connection which applies to the vibrators of each group the signals produced by the control unit, seismic receivers coupled with the formation, a system which acquires and records the seismic signals received by the seismic receivers which are reflected by subsoil discontinuities in response to the emitted periodic signals the, the control unit includes a modulator which forms m elementary sequences phase modulated by a pseudo-random sequence, the signals generated by the control unit being simultaneously applied to the different vibrators by the connection; and wherein the modulator comprises a generator which generates at least one pseudo-random control sequence, a modulator which modulates, by the sequence, the periodic signals generated by the generator, and a time lag which produces m modulated periodic signals with the time lag between each one and the signals emitted by the control unit depend on a length of each control sequence and of a received vibrational signal listening time.

32. A method of prospecting or monitoring of an underground formation by elastic waves, comprising emitting in the ground elementary sequences formed by coding of a signal by pseudo-random sequences, receiving and recording the signals reflected by the subsoil discontinuities in response to the emitted signals, and processing of the recorded signals by correlation with signals formed from the emitted signals, and wherein the signals are emitted simultaneously by seismic sources, each controlled by a signal of an elementary sequence of a length at least equal to the product of a number of simultaneously vibrating seismic sources, which are extended before and after a listening time with parts of a length at least equal to the listening time and a respective contribution of each one of the seismic sources is separated by correlating the received and recorded signals by signals constructed from the elementary sequence.

33. A method as claimed in claim 32, wherein:

the elementary sequences are formed by phase modulation of a periodic signal applied to vibrators.

34. A method as claimed in claim 33, wherein:

a same control sequence is applied to all the vibrators, with a time lag and a circular permutation, the time lag between two vibrators being at least equal to the listening time, and a length of the elementary control sequence being at least equal to a sum of the time lag and of the listening time.

35. A method as claimed in claim 33, wherein:

the vibrators are controlled by a connected set of minimum crosscorrelation sequences with each vibrator emitting a vibration with a sequence independent of the other vibrators.

36. A method as claimed in claim 34, wherein:

the vibrators are divided into groups, and a pseudo-random sequence belonging to a same group of minimum crosscorrelation sequences is assigned to each group with the vibrators of a group being controlled by a same elementary sequence with the time lag.

* * * * *